United States Patent
Jeon et al.

[11] Patent Number: 5,912,991
[45] Date of Patent: Jun. 15, 1999

[54] CONTOUR ENCODING METHOD USING ERROR BANDS

[75] Inventors: Byeung-Woo Jeon, Sungnam; Sung-Ho Cho; Rin Chul Kim, both of Koyang; Sang-Uk Lee, Seoul, all of Rep. of Korea

[73] Assignee: Samsung Electronics Co., Ltd., Kyungki-Do, Rep. of Korea

[21] Appl. No.: 08/858,886

[22] Filed: May 19, 1997

Related U.S. Application Data

[XX .
[60] Provisional application No. 60/037,720, Feb. 7, 1997.
[51] Int. Cl.[6] ....................................................... G06K 9/36
[52] U.S. Cl. ................................................. 382/242
[58] Field of Search ................................. 382/232–233, 382/236, 238, 241–242; 348/384, 390, 400–403, 409–416, 420–421

[56] References Cited

U.S. PATENT DOCUMENTS

| | | | |
|---|---|---|---|
| 5,512,956 | 4/1996 | Yan | 348/413 |
| 5,592,228 | 1/1997 | Dachiku et al. | 348/416 |
| 5,598,215 | 1/1997 | Watanabe | 348/416 |
| 5,635,986 | 6/1997 | Kim | 382/242 |
| 5,646,691 | 7/1997 | YokoYama | 348/416 |
| 5,675,669 | 10/1997 | Kim | 382/241 |
| 5,691,769 | 11/1997 | Kim | 382/242 |
| 5,710,838 | 1/1998 | Jung | 382/242 |
| 5,737,449 | 4/1998 | Lee | 382/242 |
| 5,754,703 | 5/1998 | Kim | 382/242 |
| 5,757,382 | 5/1998 | Lee | 382/242 |
| 5,757,971 | 5/1998 | Kim | 382/241 |
| 5,767,911 | 6/1998 | Boon | 348/409 |
| 5,774,595 | 6/1998 | Kim | 382/242 |
| 5,774,596 | 6/1998 | Kim | 382/242 |

FOREIGN PATENT DOCUMENTS

| | | | |
|---|---|---|---|
| 0 625 853 A2 | 5/1994 | European Pat. Off. | H04N 7/13 |
| 2 296 839 | 7/1996 | United Kingdom | H04N 5/14 |

*Primary Examiner*—Jose L. Couso
*Attorney, Agent, or Firm*—Sughrue, Mion, Zinn, Macpeak & Seas, PLLC

[57] ABSTRACT

A segment-based contour encoding method is provided. A motion compensation of an object in a current image with respect to a reference image is performed to obtain a motion-compensated image. The contour contained in the image motion-compensated is compared with a contour of an object in a current image, to divide the whole contour of the object in the current image into a global motion compensated (GMC) segments and a global motion compensation failure (GMF) segments. Each GMF segments is divided into a local motion compensated (LMC) segment and a local motion compensation failure (LMF) segment. The GMC segments and the LMC segments are motion-compensation-encoding and the LMF segments are encoded using only pixel information constituting each LMF segment. The contour encoding method can reduce the number of the LMF segments and can perform an efficient encoding operation for motion compensation encoding.

33 Claims, 6 Drawing Sheets

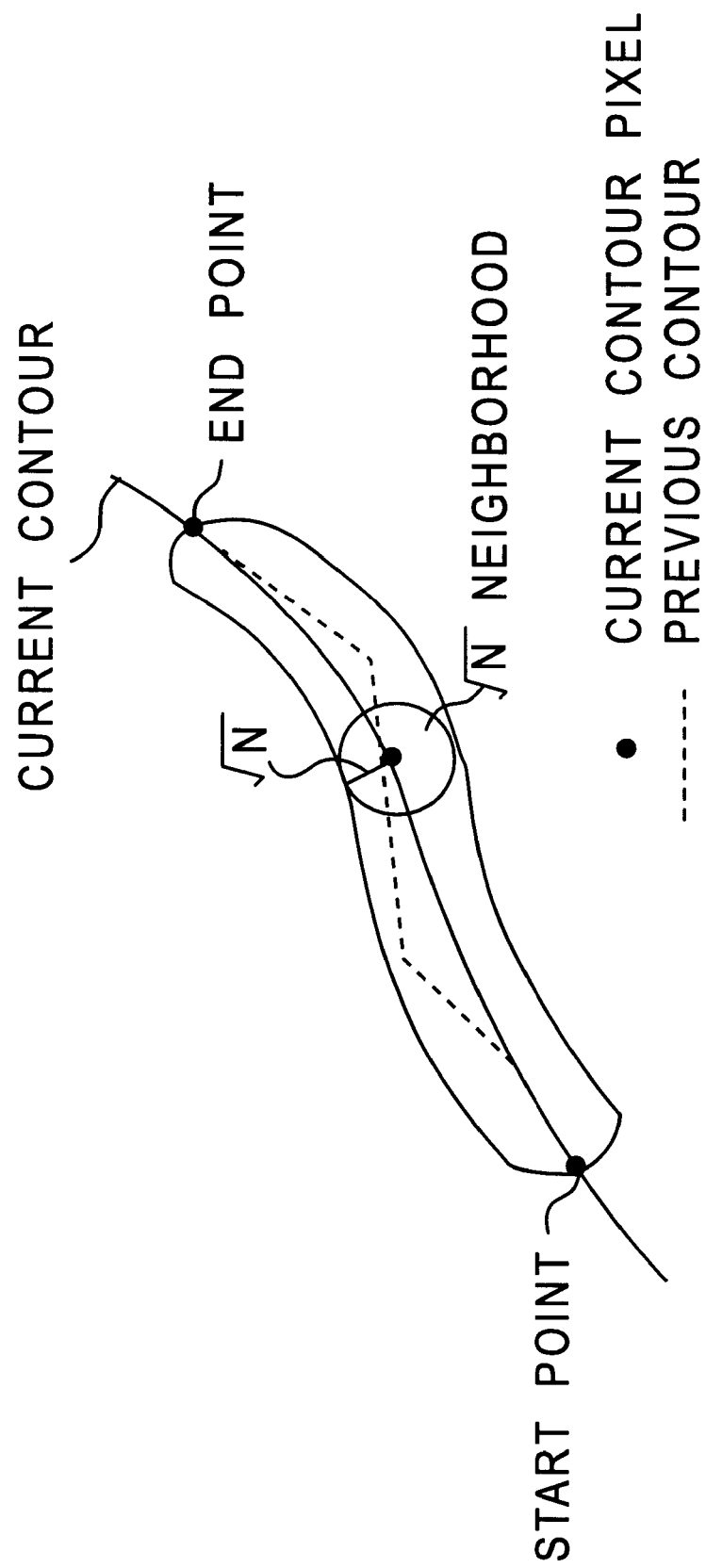

CONTOUR ENCODING METHOD USING ERROR BANDS

This is a continuation of provisional application Ser. No. 60/037,720 filed Feb. 7, 1997, abandoned.

BACKGROUND OF THE INVENTION

The present invention relates to a contour coding method for object oriented video coding. The present invention also relates to a contour motion information transmission method.

A system requiring low bit rate data transmission compresses image information at a high ratio in order to use motion image. For doing so, region based motion image coding techniques for dividing an image into regions and performing motion estimation and coding operations by regions, have been proposed instead of a conventional block-based image coding technique. The region-based motion image encoder largely relies on an algorithm for encoding region division information in view of its performance. Therefore, techniques for coding contours efficiently are needed.

Referring to FIG. 1 showing region-based motion compensation, assuming that the motion compensation is performed using the object in the previous frame, motion compensated errors will occur around an object along the motion trajectory, due to the inaccuracy in the motion estimation or the deformation of the object. If the region with large motion compensation errors is defined as the motion compensation failure region, the motion compensation failure region (hereinafter, called "MF region") is considered as the mismatched region between a current object and the motion compensation object. In FIG. 1, the MF regions are indicated as shading portions neighboring the current object and the contours surrounding the current object are denoted by thick lines.

Generally, an encoder and a decoder involving a region-based motion image coding know information with respect to the contours of an object in a previous frame in advance. Thus, the contours in the current frame can be effectively encoded using motion compensation. When the motion compensation is used, only contour pixels corresponding to the MF region among the contour pixels contained in the contours of the object in the current frame are required for transmission, since the others can be estimated from the contours of the motion compensation object in the previous frame.

A reference [1] entitled "Contour simplification and motion compensated coding", published in Special Issue of Signal Processing: Image Communication on Coding Techniques for Very Low Bit-rate Video, Vol. 7, No. 4–6, pp. 279–296, November 1995, by C. Gu and M. Kunt, discloses a predictive contour coding technique for video coding using temporal correlation. According to the reference [1], after motion-compensation of each object, the contour pixels in the MF regions are encoded and transmitted by the conventional chain coding technique.

However, since the MF regions are generally distributed in a sparse and isolated manner, each isolated contour requires a number of overheads to represent it with chain codes. Further, since the motion compensation is performed on an object basis, even small local motion behavior regions within the object are determined as MF regions. Therefore, inter frame correlation of the contours cannot be exploited.

SUMMARY OF THE INVENTION

To solve the above problems, it is an object of the present invention to provide a contour encoding method which can effectively compress contours by using motion compensation on a segment basis.

It is another object of the present invention to provide a contour motion information transmission method.

To accomplish the above object of the present invention, there is provided a segment-based contour encoding method comprising the steps of: (a) performing motion compensation of an object in a current image with respect to a reference image to obtain a motion-compensation image; (b) comparing the contour contained in the image motion-compensation in step (a) with a contour of an object in a current image, to divide the whole contour of the object in the current image into a global motion compensated (GMC) segments and a global motion compensation failure (GMF) segments; (c) dividing each GMF segments of step (b) into a local motion compensation (LMC) segment and a local motion compensation failure (LMF) segment; and (d) motion-compensation-encoding the GMC segments and the LMC segments and encoding the LMF segments using only pixel information constituting each LMF segment.

To accomplish another object of the present invention, there is also provided a contour motion information transmission method comprising the steps of: (a) contour-encoding an object in a current image using motion compensation; and (b) transmitting position information of the current object which has been contour-encoded in step (a).

The above-described another object can be accomplished by providing a contour motion information transmission method comprising the steps of: (a) contour-encoding an object in a current image using motion compensation; and (b) transmitting position information represented as one of an absolute position and a relative position of the current object which has been contour-encoded in step (a).

BRIEF DESCRIPTION OF THE DRAWINGS

The preferred embodiments are described with reference to the drawings wherein:

FIG. 3b shows an example of an error band having a width $2\sqrt{N}$;

DETAILED DESCRIPTION OF THE PREFERRED EMBODIMENT

A preferred embodiment of the present invention will be described with reference to the accompanying drawings.

Figure 1:
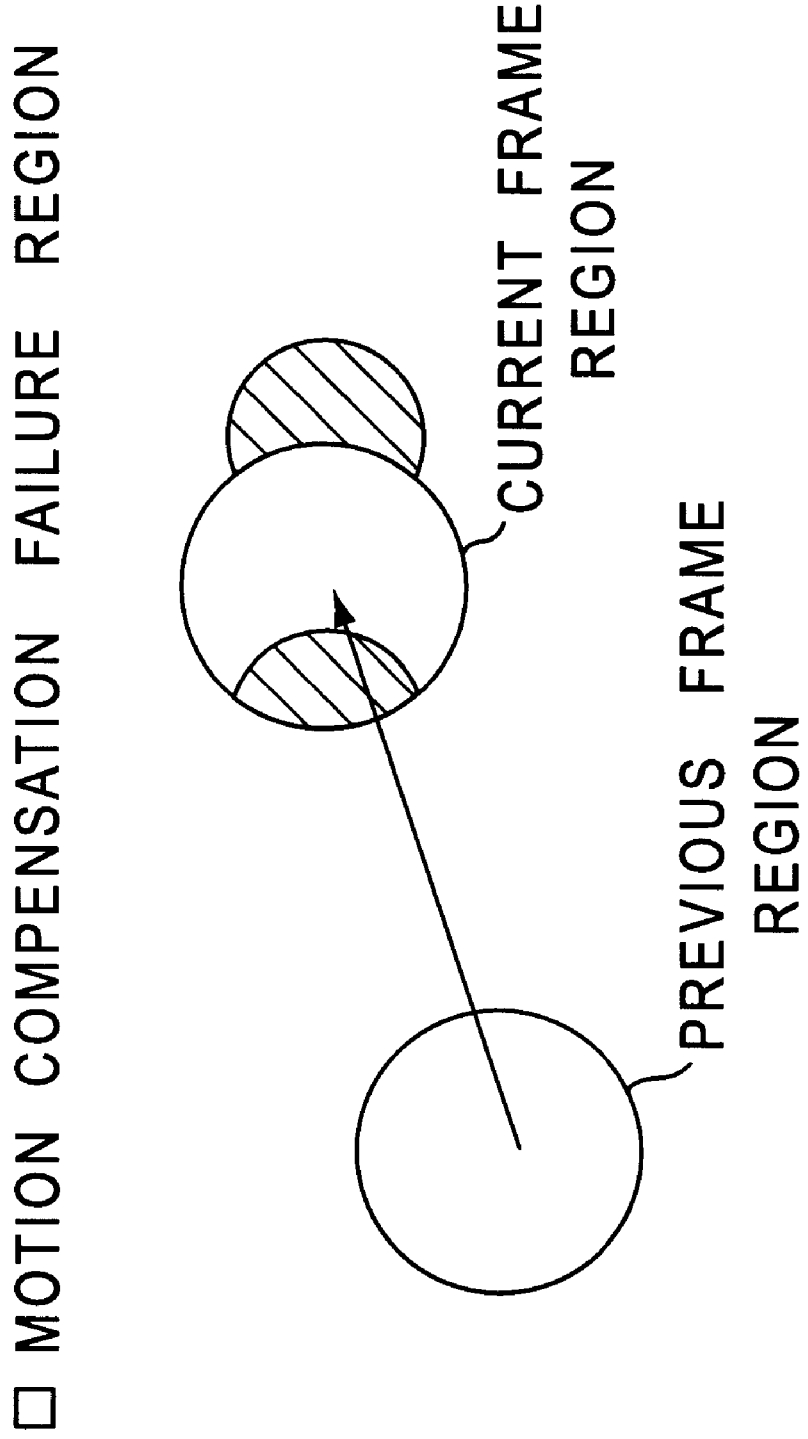
FIG. 1 is a conceptual diagram for explaining region-based motion compensation.
Figure 2:
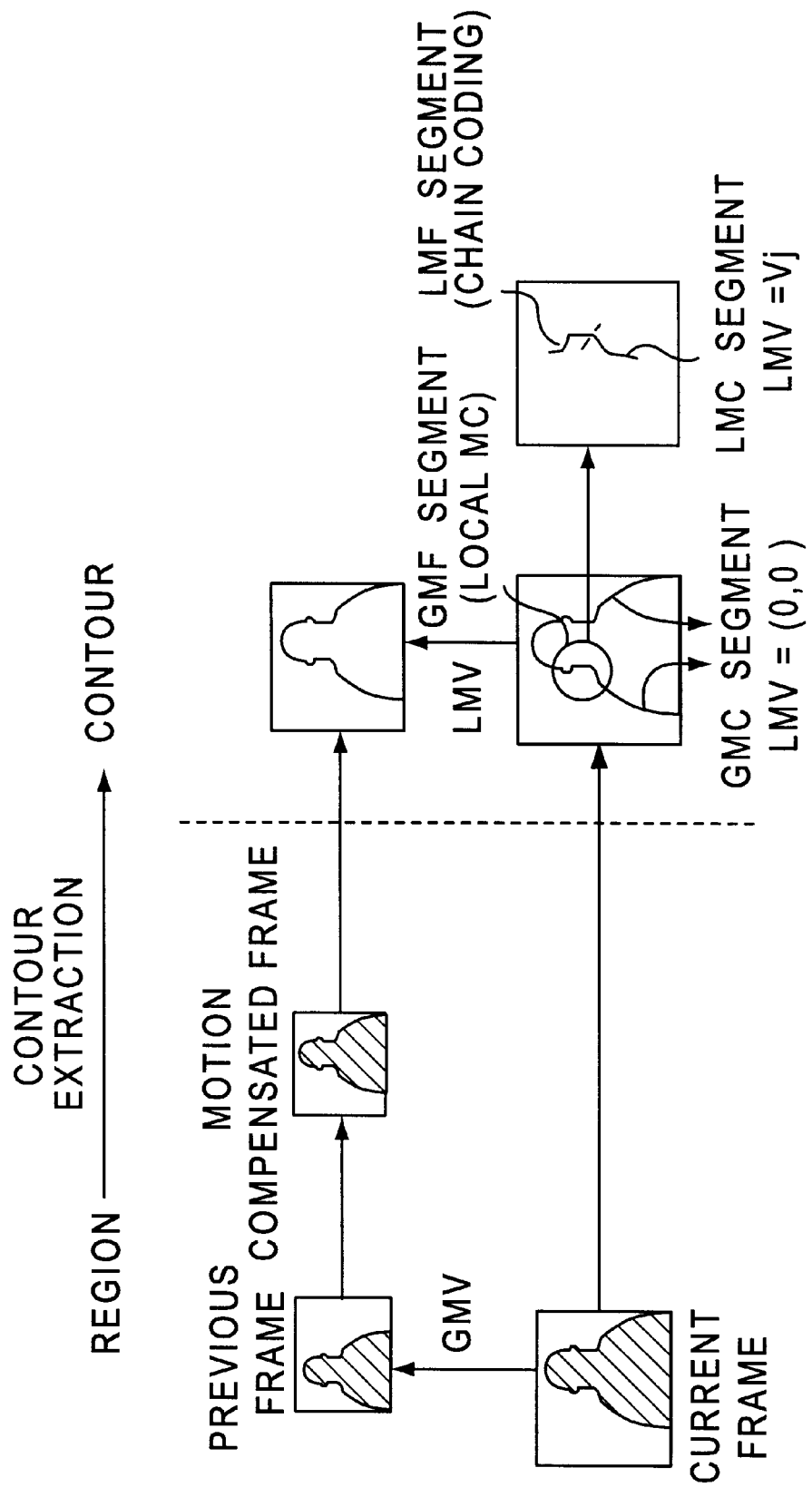
FIG. 2 is a view showing a segment division system for a contour encoding method according to the present invention.

The present invention provides a new segment-based contour encoding method using motion information for an object-oriented video coding. In the contour encoding method according to the present invention, the contours of an object contained in the current image frame is divided into several segments using two-stage motion compensation. Referring to FIG. 2, the first-stage motion compensation is performed on an object basis similarly to the above-described reference [1]. A global motion vector (GMV)

represents motion between an object in the current image frame and a corresponding object in the reference image frame, which is used for motion compensation involving the object in the current image frame. The GMV can be obtained via various algorithms used for object-based motion compensation. The present invention uses an existing block matching algorithm to find the GMV. As a result, the contours of the object contained in the current image frame are divided into the GMC segments and the GMF segments. FIG. 2 shows an example having a single GMF segment.

In case of the GMF segment, the second stage motion compensation is performed. In the second stage segment compensation, the local search around the current position of the GMF motion is performed in such a manner that the contour pixels locally coincident with the contour pixels belonging to the GMF segment is found among the motion compensated contours. To find the LMV segment, the search with respect to all segments within the search area contained in the motion compensated frame is performed. The search area is properly selected according to change of frame scene, that is, the motion degree of an object. The contour can be generally represented by only two gray levels. Therefore, in the case that the motion compensation is performed with respect to each segment, the simple Hamming distance is employed for distortion measure. If the GMV and LMV yielding the minimal Hamming distance are determined, the motion compensated contours are obtained with respect to the contours in the current frame using the GMV and LMV. As a result, the GMF segment is divided into the LMC segment and the LMF segment.

While the GMC and LMC segments can be reconstructed by the decoder using the GMV and LMV, respectively, the LMF segments cannot be reconstructed. The LMF motions should be encoded by the inter-frame contour coding technique and a large number for encoding the contours can be minimized by reducing the number of bits are consumed for encoding the LMF segments. Thus, the bit number for encoding the contours can be minimized by reducing the number of segments which become the LMF segments.

The present invention proposes the concept of an error band in order to reduce the number of the segments which become the LMF segments. The error band $EB_N$ of a width $2\sqrt{N}$ is defined by the union of the $\sqrt{N}$ neighborhoods of the individual contour pixels, given by the following equation (1)

$$EB_N = \bigcup_{x \in C} B_{\sqrt{N}}(x). \quad (1)$$

Here, C is a set of the contour pixels in the LMF segment, $\sqrt{N}$ neighbourhood of the p-th contour pixel, that is, $B_{\sqrt{N}}(p)$ is expressed by the following equation (2):

$$B_{\sqrt{N}}(p) = \{x : d(x, p) \leq \sqrt{N}\}. \quad (2)$$

Here, d(x,p) is a Euclidean distance.

Figure 3A:
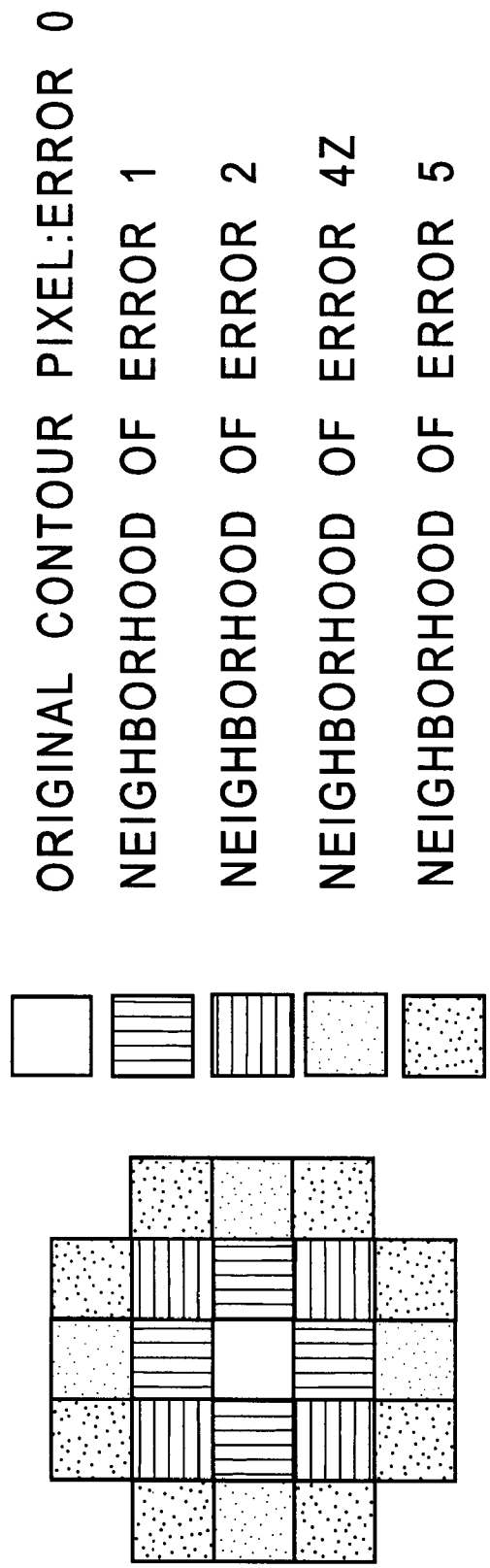
FIG. 3a shows an original contour pixel and the neighboring pixels.

FIG. 3a shows an original contour pixel having no error and the neighboring pixels each of which has an error. FIG. 3b shows an example of an error band having a width $2\sqrt{N}$. Given the LMF segment from the start point to the end point as shown in FIG. 3b, the LMF segment is considered as being coincident with the locally motion compensated contour if the locally motion compensated contour exists in the error band of width $2\sqrt{N}$ involving the given LMF segment. In other words, if the error band of the LMF segment includes the motion compensated contour, the segment is considered as the LMC segment. Thus, the inter-frame correlation of the contours is exploited effectively, the number of the segments which become the LMF segments. Moreover, the bit number for contour encoding is reduced by varying the width $2\sqrt{N}$ of the error band. Such a method can be used for dividing the segment into the GMC segment and the GMF segment. That is, if the GMC contour exists in the error band of a predetermined width centered at a contour in the current frame, even a segment which can be regarded as a GMF segment is considered as a GMC segment. By the above method, the number of the GMC segments increases to reduce the number of bits required.

Given the perfectly 8-connected contours, the contours of the current frame are divided into three kinds of segments, that is, GMC segments, LMC segments and an LMF segments, according to the above-described two-state motion compensation. Then, each segment is encoded sequentially along predetermined directions of the contours. However, the methods for encoding each segments vary according to the kinds of the segments. The GMC segment and LMC segment are encoded into MC segment codes. Here, the GMC segment can be treated as a kind of LMC segments where the LMV is equal to zero vector. The LMF segments are encoded into the MF segment codes by a neighbouring direction segment coding (NDSC) technique, which is one of the most efficient intra-frame contour coding techniques. The NDSC technique is disclosed in a reference [2] entitled "Encoding of arbitrary curves based on chain code representation," published in *IEEE Trans. on Commun.*, Vol. COM-33, pp. 697–707, July 1985, by T. Kaneko and Okudaira.

Figure 4:
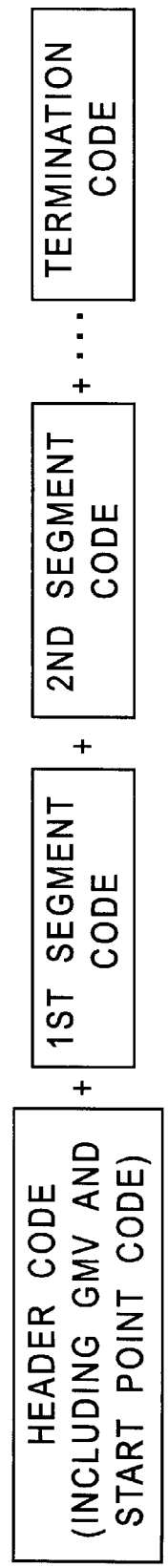
FIG. 4 shows a bit stream syntax for transmission of contour encoded data.

FIG. 4 shows a bit stream syntax for a contour encoding technique according to the present invention. The bit stream shown in FIG. 4 starts with a header code which is followed by segment codes. Lastly, a termination code is appended to indicate the end of the codes. Each segment is encoded into the MC segment code or the MF segment code according to the segment type. The GMC segment and the LMC segment are encoded into the MC segment code and the LMF segment is encoded into the MF segment code.

Figure 5:
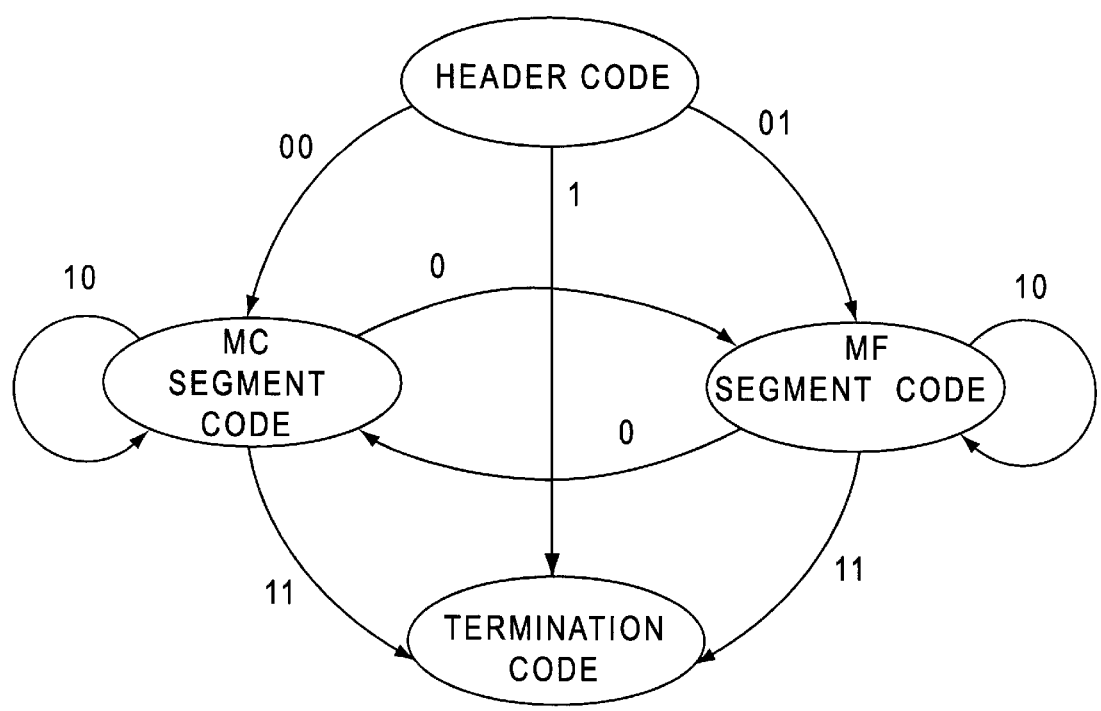
FIG. 5 shows segment transition involving a motion compensation flag.

In order to discriminate the types of the segments, each segment code begins with the MC flag determined by the previous segment type. The MC flag is described by the segment transition diagram shown in FIG. 5. In FIG. 5, the values on each branch denotes the MC flag for the next segment. For example, the MC flag for the first segment becomes "00" if the segment is encoded into the MC segment code, or becomes "01" if the segment is encoded into the MF segment. Each code will be described below.

Header Code

The encoded bit stream for the contours starts with the header code. The header code includes the GMV and the start point code. The GMV denotes the motion vector used for the first state motion compensation. Using the GMV, the motion compensated contours are provided, from the contours in the previous frame and contours in the current frame. By the first stage motion compensation, a contour start point in the current frame may not coincide with that of the motion compensated contour. In order to denote the start point in the current frame, the start point code is required for transmission.

For the image in the QCIF format (176×144), the start point can be encoded by 16 bits. However, since the motion compensated contours are similar to contours in the current frame, the start point of contour of the current frame can be encoded by the relative position from that of the motion compensated contour. Both methods are employed in encoding the start point of the contour in the current frame and one method is selected by considering their efficiency. In order to indicate which method is used, a 1 bit position flag is added. If the relative position is within [−4.3]×[4.3], the position flag is set to one and the start point is encoded by 6 bits. Otherwise, the position flag is set to zero and the absolute position of the start point of the contour in the current frame is encoded into the start code of 16 bits.

When the relative position is encoded, an identification (ID) representing what is a reference object is additionally encoded. Usually, each object has an assigned ID, accordingly an object ID should be encoded.

A relative position encoding method and an absolute position encoding method can be selected periodically. For example, one of the methods is selected so that an absolute position value should be encoded for every predetermined time. This purposes for reduction of propagation of an error. The length of the GMC segment is encoded together with the start point information. Here, the length of the GMC segment is the number of the contour pixels constituting the GMC segment. The only contour images contained in the reference frame and the current frame can be used as areas requiring the motion compensation. An object image including a general texture, that is, inner pixel values of the contour can be used as the motion compensation requisite areas.

MC Segment Code

Since the only difference between the GMC segment and the LMC segment is whether the LMV is zero or not, the GMC segment and the LMC segment are encoded into the MC segment codes. Using the error band, the segment is considered as the GMF or the LMF segment, if its error band includes the motion compensated contour. The MC segment code starts with the proper MC flag, followed by the LMV and the length of the segments, which are variable-length coded. Here, it should be noted that, if a short segment can be encoded into the MC segment code, the more bit would be required than the MF segment code. By considering this aspect, among the GMC segment and the LMC segment, only those segments whose lengths are greater than the pre-specified threshold are encoded into the MC segment codes.

Each components of the LMV are encoded by the variable length codes whose lengths range from 1 to 5 bits. Particularly, the LMV for the GMC segment is encoded using 2-bit variable length code. The Huffman code set with respect to the LMV is shown in Table 1.

TABLE 1

| LMV | Code  | LMV | Code |
|-----|-------|-----|------|
| −4  | 10110 | 0   | 0    |
| −3  | 10111 | 1   | 100  |
| −2  | 1111  | 2   | 1110 |
| −1  | 110   | 3   | 1010 |

The length of the MC segment is encoded using the Huffman code set shown in Table 2.

TABLE 2

| Length | Code   | Length | Code              |
|--------|--------|--------|-------------------|
| 1      | 00     | 17     | 1110000           |
| 2      | 010    | :      | :                 |
| 3      | 0110   | 28     | 11111011          |
| 4      | 0111   | 29     | 1111110000        |
| 5      | 1000   | :      | :                 |
| 6      | 1001   | 40     | 1111111011        |
| 7      | 1010   | 41     | 11111110000       |
| 8      | 1011   | :      | :                 |
| 9      | 11000  | 52     | 111111111011      |
| 10     | 11001  | 52     | 111111111110000   |
| 11     | 11011  | :      | :                 |
| 13     | 111000 | ≧65    | 111111111111+CO(/)|
| :      | :      |        |                   |
| 16     | 111011 |        |                   |

In Table 2, CO(l) is a fixed length code for the length l of the MC segment. Since the length below the threshold does not occur, the length l of the MC segment is encoded into MCL(l) as the following equation.

$$MCL(l)=(SL(l-threshold)) \quad (3)$$

Here, SL(p) represents the code for the length p in Table 2.

MF Segment Code

The LMF segment is encoded into the MF segment code. The NDSC technique is employed for encoding the LMF segments. More specifically, the LMF segment is further divided into small segments such that the contour pixels in the same segment have only two neighbouring directions. Then, each segment is encoded with variable-length codes using Table 1 and the direction of the individual pixels by 1 bit.

Each small segment in the LMF segment begins with the MC flag shown in FIG. 5, and the initial octal code that restricts the direction of the pixels in the segment. Similar to the NDSC technique, the octal code which denotes the pair of neighbouring direction, is encoded by considering the previous direction as follow.

1) if the MF segment is the first segment, the octal code is encoded by 3bits, 2) if the MF segment is not the first segment, and the previous direction of the contour is diagonal, the octal code is encoded by 1 bit, and 3) otherwise, the octal code is encoded by 2 bits.

Here, perfectly 8-connected contour has 3 moving cases after diagonal move, and 5 moving cases after vertical/horizontal move.

Termination Code

If all the remaining contours are classified into the GMC segment, or there remains no segment to be encoded, the termination codes are appended to indicate that the bit stream for the current contours is terminated. The termination code consists of only the MC flag, which is "1" when all the contours are classified into the GMC segment, or "11" otherwise, as shown in FIG. 5.

As described above, the contour encoding method according to the present invention divides the GMF segments into the LMC segments and the LMF segments and encodes the divided results. Also, the number of the LMF segments can be reduced. In addition, the degree allowed as the LMC segment among the LMF segments can vary according to the bit number required for contour encoding. Thus, the present invention can perform an efficient encoding operation for motion compensation encoding.

While only certain embodiments of the invention have been specifically described herein, it will apparent that numerous modifications may be made thereto without departing from the spirit and scope of the invention.

What is claimed is:

1. A segment-based contour encoding method comprising the steps of:
   (a) performing motion compensation of an object in a current image with respect to a reference image to obtain a motion-compensated image;
   (b) comparing the contour contained in the image motion-compensated in step (a) with a contour of an object in a current image, to divide the whole contour of the object in the current image into a global motion compensated (GMC) segments and a global motion compensation failure (GMF) segments;
   (c) dividing each GMF segment of step (b) into a local motion compensated (LMC) segment and a local motion compensation failure (LMF) segment; and
   (d) motion-compensation-encoding the GMC segments and the LMC segments and encoding the LMF segments using only pixel information constituting each LMF segment.

2. The contour encoding method according to claim 1, wherein the contour image in a reference frame is used as a reference image and that in the current frame is sued as the current image.

3. The contour encoding method according to claim 1, wherein an object image including a texture in a reference frame is used as the reference image and that including a texture in a current frame is used as the current image.

4. The contour encoding method according to claim 1, wherein said step (b) comprises the sub-steps of:
   (b1) judging whether the object contour contained in the motion compensated image is contained in an error band having a predetermined width centered at each GMF segment; and
   (b2) reducing the number of the GMF segments contained in the current image according to the judgment result of sub-step (b1).

5. The contour encoding method according to claim 4, wherein the width of said error band varies according to the bit number required for contour encoding.

6. The contour encoding method according to claim 4, wherein the error band ($EB_N$) having the width of $2\sqrt{N}$ is expressed as the following equation involving the $\sqrt{N}$ neighborhood of each contour in the corresponding GMF segment, $$EB_N = \bigcup_{x \in C} B_{\sqrt{N}}(x)$$

where C is a set of the contour pixels in the GMF segment, and the $\sqrt{N}$ neighborhood $B_{\sqrt{N}}(p)$ of the p-th contour pixel is expressed as the following equation, $$B_{\sqrt{N}}(p) = \{x : d(x, p) \leq \sqrt{N}\}$$

where $d(x,p)$ is a Euclidean distance.

7. The contour encoding method according to claim 1, wherein said step (c) comprises the sub-steps of:

(c1) judging whether the object contour contained in the motion compensated image is contained in an error band having a predetermined width centered at each LMF segment; and
(c2) reducing the number of the LMF segments contained in the current image according to the judgment result of sub-step (c1).

8. The contour encoding method according to claim 7, wherein the width of said error band varies according to the bit number required for contour encoding.

9. The contour encoding method according to claim 7, wherein the error band ($EB_N$) having the width of $2\sqrt{N}$ is expressed as the following equation involving the $\sqrt{N}$ neighborhood of each contour in the corresponding LMF segment, $$EB_N = \bigcup_{x \in C} B_{\sqrt{N}}(x)$$

where C is a set of the contour pixels in the LMF segment, and the $\sqrt{N}$ neighborhood $B_{\sqrt{N}}(p)$ of the p-th contour pixel is expressed as the following equation, $$B_{\sqrt{N}}(p) = \{x : d(x, p) \leq \sqrt{N}\}$$

where $d(x,p)$ is a Euclidean distance.

10. The contour encoding method according to claim 1, wherein said step (c) comprises the steps of locally searching the current position neighborhood in the GMF segment and finding a contour which is locally coincident with the contour belonging to the GMF segment.

11. The contour encoding method according to claim 10, wherein the step of finding the contour comprises the sub-steps of:
   calculating a respective Hamming distance with respect to all the segments which can be formed within the search area contained in the motion compensated frame; and
   determining a contour corresponding to the minimum Hamming distance among the calculated Hamming distances.

12. The contour encoding method according to claim 1, wherein said step (d) encodes each LMF segment using a chain encoding technique.

13. A contour motion information transmission method comprising the steps of:
   (a) contour-encoding an object in a current image using motion compensation;
   (b) dividing the contour of the contour-encoded object into global motion compensated (GMC) segments and global motion compensated failure (GMF) segments, by judging whether the contour of the contour-encoded object is contained in an error band having a predetermined width centered at a respective one of the GMF segments, and reducing the number of the GMF segments contained in the current image according to the judgment result;
   (c) obtaining position information of the contour-encoded object with respect to the GMC segments and reduced number of GMF segments obtained in step (b); and
   (d) transmitting the position information of the contour-encoded object.

14. The contour encoding information transmission method according to claim 13, wherein the position information of the current object represents an absolute position of the current object.

15. The contour motion information transmission method according to claim 13, wherein the position information of the current object represents a relative position of the current object with respect to a reference object.

16. The contour motion information transmission method according to claim 15, wherein the relative position of the current object expressed as the relative position of the start point of the current object with respect to a start point of the reference object and the number of the contour pixels of the current object.

17. The contour motion information transmission method according to claim 15, wherein the position information of the current object contains the relative position of the current object with respect to the reference object and the identification of the reference object, when a plurality of objects exist.

18. A contour motion information transmission method comprising the steps of:
   (a) contour-encoding an object in a current image using motion compensation;
   (b) dividing the contour of the contour-encoded object into global motion compensated (GMC) segments and global motion compensated failure (GMF) segments, by judging whether the contour of the contour-encoded object is contained in an error band having a predetermined width centered at a respective one of the GMF segments, and reducing the number of the GMF segments contained in the current image according to the judgment result;
   (c) obtaining position information of the contour-encoded object with respect to the GMC segments and reduced number of GMF segments obtained in step (b); and
   (d) transmitting the position information represented as one of an absolute position and relative position of the current object which has been contour-encoded in step (a).

19. The contour motion information transmission method according to claim 18, wherein the position information of the current object represents an absolute position of the current object and a flag indicating the absolute position.

20. The contour motion information transmission method according to claim 18, wherein the position information of the current object represents a relative position of the current object with respect to a reference object and a flag indicating the relative position.

21. The contour motion information transmission method according to claim 20, wherein the relative position of the current object is expressed as the relative position of the start point of the current object with respect to a start point of the reference object and the number of the contour pixels of the current object.

22. The contour motion information transmission method according to claim 18, wherein the position information of the current object contains the relative position of the current object with respect to the reference object and the identification of the reference object and a flag indicating a relative position, when a plurality of objects exist.

23. The contour motion information transmission method according to claim 18, wherein said step (b) transmits the position information represented as an absolute position of the current object for every predetermined interval of time.

24. The contour encoding method according to claim 13, wherein the width of said error band varies according to the bit number required for contour encoding.

25. The contour encoding method according to claim 13, wherein the error band ($EB_N$) having the width of $2\sqrt{N}$ is expressed as the following equation involving the $\sqrt{N}$ neighborhood of each contour in the corresponding GMF segment, $$EB_N = \bigcup_{x \in C} B_{\sqrt{N}}(x)$$

where C is a set of the contour pixels in the GMF segment, and the $\sqrt{N}$ neighborhood $B_{\sqrt{N}}(p)$ of the p-th contour pixel is expressed as the following equation, $$B_{\sqrt{N}}(p) = \{x : d(x, p) \leq \sqrt{N}\}$$

where $d(x,p)$ is a Euclidean distance.

26. A contour motion information transmission method comprising the steps of:
   (a) contour-encoding an object in a current image using motion compensation;
   (b) dividing the contour of the contour-encoded object into global motion compensated (GMC) segments and global motion compensated failure (GMF) segments;
   (c) obtaining position information of the contour-encoded object with respect to the GMC segments and reduced number of GMF segments obtained in step (b), by judging whether the contour of the contour-encoded object is contained in an error band having a predetermined width centered at a respective one of the LMF segments, and reducing the number of the LMF segments contained in the current image according to the judgment result; and
   (d) transmitting the position information of the contour-encoded object.

27. The contour encoding method according to claim 26, wherein the width of said error band varies according to the bit number required for contour encoding.

28. The contour encoding method according to claim 26, wherein the error band ($EB_N$) having the width of $2\sqrt{N}$ is expressed as the following equation involving the $\sqrt{N}$ neighborhood of each contour in the corresponding GMF segment, $$EB_N = \bigcup_{x \in C} B_{\sqrt{N}}(x)$$

where C is a set of the contour pixels in the GMF segment, and the $\sqrt{N}$ neighborhood $B_{\sqrt{N}}(p)$ of the p-th contour pixel is expressed as the following equation, $$B_{\sqrt{N}}(p) = \{x : d(x, p) \leq \sqrt{N}\}$$

where $d(x,p)$ is a Euclidean distance.

29. The contour encoding method according to claim 18 wherein the width of said error band varies according to the bit number required for contour encoding.

30. The contour encoding method according to claim 18, wherein the error band ($EB_N$) having the width of $2\sqrt{N}$ is expressed as the following equation involving the $\sqrt{N}$ neighborhood of each contour in the corresponding GMF segment, $$EB_N = \bigcup_{x \in C} B_{\sqrt{N}}(x)$$

where C is a set of the contour pixels in the GMF segment, and the √N neighborhood $B_{\sqrt{N}}(p)$ of the p-th contour pixel is expressed as the following equation, $$B_{\sqrt{N}}(p) = \{x : d(x, p) \leq \sqrt{N}\}$$

where d(x,p) is a Euclidean distance.

31. A contour motion information transmission method comprising the steps of:
   (a) contour-encoding an object in a current image using motion compensation;
   (b) dividing the contour of the contour-encoded object into global motion compensated (GMC) segments and global motion compensated failure (GMF) segments;
   (c) obtaining position information of the contour-encoded object with respect to the GMC segments and reduced number of GMF segments obtained in step (b), by judging whether the contour of the contour-encoded object is contained in an error band having a predetermined width centered at a respective one of the GMF segments, and reducing the number of the LMF segments contained in the current image according to the judgment result; and
   (d) transmitting the position information of an absolute position and a relative position of the current object which has been contour-encoded in step (a).

32. The contour encoding method according to claim 31, wherein the width of said error band varies according to the bit number required for contour encoding.

33. The contour encoding method according to claim 31, wherein the error band ($EB_N$) having the width of 2√N is expressed as the following equation involving the √N neighborhood of each contour in the corresponding GMF segment, $$EB_N = \bigcup_{x \in C} B_{\sqrt{N}}(x)$$

where C is a set of the contour pixels in the GMF segment, and the √N neighborhood $B_{\sqrt{N}}(p)$ of the p-th contour pixel is expressed as the following equation, $$B_{\sqrt{N}}(p) = \{x : d(x, p) \leq \sqrt{N}\}$$

where d(x,p) is a Euclidean distance.

* * * * *